United States Patent
Jo

(10) Patent No.: US 9,509,900 B2
(45) Date of Patent: Nov. 29, 2016

(54) CAMERA CONTROL METHOD, AND CAMERA CONTROL DEVICE FOR SAME

(71) Applicant: SK TELECOM CO., LTD., Seoul (KR)

(72) Inventor: Young-gwan Jo, Seongnam-si (KR)

(73) Assignee: SK TELECOM CO., LTD., Seoul (KR)

( * ) Notice: Subject to any disclaimer, the term of this patent is extended or adjusted under 35 U.S.C. 154(b) by 0 days.

(21) Appl. No.: 14/697,578

(22) Filed: Apr. 27, 2015

(65) Prior Publication Data

US 2015/0244928 A1    Aug. 27, 2015

Related U.S. Application Data

(63) Continuation of application No. PCT/KR2013/009067, filed on Oct. 10, 2013.

(30) Foreign Application Priority Data

Oct. 29, 2012   (KR) .................. 10-2012-0120696

(51) Int. Cl.
*H04N 5/232*    (2006.01)
*G08B 13/196*    (2006.01)
*G06T 7/00*    (2006.01)

(52) U.S. Cl.
CPC ......... *H04N 5/23216* (2013.01); *G06T 7/0018* (2013.01); *G08B 13/19643* (2013.01); *H04N 5/232* (2013.01); *H04N 5/23206* (2013.01); *H04N 5/23296* (2013.01)

(58) Field of Classification Search
CPC ................ H04N 5/23216; H04N 5/23203
USPC ...................................... 348/211.4
See application file for complete search history.

(56) References Cited

U.S. PATENT DOCUMENTS

| 7,671,893 | B2 * | 3/2010 | Li | H04N 7/17318 |
| | | | | 348/143 |
| 9,286,680 | B1 * | 3/2016 | Jiang | G06T 7/0018 |
| 2003/0210329 | A1 * | 11/2003 | Aagaard | H04N 7/181 |
| | | | | 348/159 |

(Continued)

FOREIGN PATENT DOCUMENTS

| JP | 2008118402 A | 5/2008 | |
| JP | WO 2011148595 A1 * | 12/2011 | ............... G06T 3/00 |

(Continued)

OTHER PUBLICATIONS

International Search Report for PCT/KR2013/009067 dated Jan. 6, 2014.

*Primary Examiner* — Roberto Velez
*Assistant Examiner* — Cynthia Segura
(74) *Attorney, Agent, or Firm* — Hauptman Ham, LLP

(57) ABSTRACT

A camera control apparatus includes a database to store camera installation information of the cameras including a main camera and one or more sub-cameras; an image acquisition unit to acquire at least one image from the cameras; and a camera controller to convert image center coordinates of the image acquired by the main camera to three-dimensional coordinates on a three-dimensional reference coordinate system, by using the camera installation information, select at least one new main camera from among the one or more sub-cameras that include the three-dimensional coordinates as field-of-view information, and calculate a control value of the newly selected main camera for controlling the newly selected main camera to gaze the three-dimensional coordinates.

16 Claims, 5 Drawing Sheets

(56) References Cited

U.S. PATENT DOCUMENTS

| | | | | |
|---|---|---|---|---|
| 2006/0023073 | A1* | 2/2006 | Li | H04N 7/17318 348/211.99 |
| 2008/0129825 | A1* | 6/2008 | DeAngelis | A63B 24/0021 348/169 |
| 2008/0225137 | A1* | 9/2008 | Kubo | H04N 5/23203 348/231.2 |
| 2010/0066734 | A1* | 3/2010 | Ohta | G06T 15/30 345/419 |
| 2010/0118141 | A1* | 5/2010 | Bouchon-Meunier | H04N 5/232 348/135 |
| 2010/0194882 | A1* | 8/2010 | Belsarkar | G08B 13/19602 348/143 |
| 2011/0013017 | A1* | 1/2011 | Lee | H04N 5/232 348/143 |
| 2011/0096169 | A1* | 4/2011 | Yu | H04N 7/181 348/159 |
| 2011/0149041 | A1* | 6/2011 | Eccles | G06T 7/0018 348/46 |
| 2012/0154593 | A1* | 6/2012 | Anderson | H04N 5/222 348/157 |
| 2012/0169882 | A1* | 7/2012 | Millar | H04N 7/181 348/159 |
| 2013/0057542 | A1* | 3/2013 | Takenaka | G06T 3/0031 345/419 |
| 2013/0064430 | A1* | 3/2013 | Nakano | G06T 3/00 382/103 |
| 2013/0070092 | A1* | 3/2013 | Miyahara | H04N 5/232 348/143 |
| 2013/0121560 | A1* | 5/2013 | Hirai | G06K 9/00261 382/154 |
| 2013/0235163 | A1* | 9/2013 | Joo | H04N 13/007 348/47 |
| 2014/0078263 | A1* | 3/2014 | Kim | G06T 7/2093 348/47 |
| 2014/0092268 | A1* | 4/2014 | Cleveland | G06F 3/012 348/211.4 |
| 2014/0098198 | A1* | 4/2014 | Lee | H04N 13/0246 348/48 |
| 2014/0168389 | A1* | 6/2014 | Han | H04N 13/0402 348/51 |
| 2014/0368621 | A1* | 12/2014 | Michiyama | H04N 5/23216 348/50 |
| 2015/0116197 | A1* | 4/2015 | Hamelink | G06F 3/013 345/156 |
| 2015/0116502 | A1* | 4/2015 | Um | H04N 7/181 348/169 |
| 2015/0371104 | A1* | 12/2015 | Fung | G06K 9/46 348/50 |

FOREIGN PATENT DOCUMENTS

| | | |
|---|---|---|
| JP | 2012520650 A | 9/2012 |
| KR | 100862398 B1 | 10/2008 |
| KR | 1020090011826 A | 2/2009 |
| KR | 1020100129125 A | 12/2010 |

\* cited by examiner

CAMERA CONTROL METHOD, AND CAMERA CONTROL DEVICE FOR SAME

CROSS-REFERENCE TO RELATED APPLICATIONS

The present application is a continuation of International Application No. PCT/KR2013/009067 filed on Oct. 10, 2013, which is based on, and claims priority from Korean Patent Application No. 10-2012-0120696 filed in the Korean Intellectual Property Office on Oct. 29, 2012. The disclosures of the above-listed applications are hereby incorporated by reference herein in their entirety.

TECHNICAL FIELD

The present disclosure relates to a camera control method and a camera control apparatus therefor.

BACKGROUND

The statements in this section merely provide background information related to the present disclosure and do not constitute prior art.

In a known method for controlling a photographing direction of one or more cameras, a user selects a camera among a number of cameras by using a camera controller, and then the camera controller operates the selected camera to control the photographing direction of the one or more cameras. While the user operates the camera controller, it generates a camera control signal. Based on the camera control signal received via a network from the camera control device, the camera is driven by a motor of the camera to thereby track a subject (or an object) aimed in the photographing direction.

With the selected camera, the user can then observe a moving object. The inventor(s) has experienced that if the moving object leaves out of the field of view (FOV) of the camera, the user needs to manually select another camera among the cameras to catch the moving object such that the selected another camera can cover the moving object in its field of view. However, the inventor(s) has noted that the moving object may be lost while the user is selecting another camera, especially when the moving object moves fast or unpredictively moves.

SUMMARY

In accordance with some aspects of the present disclosure, a camera control apparatus comprises a database, an image acquisition unit, and a camera controller. The database is configured to store camera installation information of the cameras including a main camera and one or more sub-cameras. The image acquisition unit is configured to acquire images from the cameras. And the camera controller is configured to convert image center coordinates of the image acquired by the main camera to three-dimensional coordinates on a three-dimensional reference coordinate system, by using the camera installation information, select at least one new main camera from among the one or more sub-cameras that include the three-dimensional coordinates as field-of-view information, and calculate a control value of the newly selected main camera for controlling the newly selected main camera to gaze the three-dimensional coordinates.

In accordance with another aspect of the present disclosure, a camera control apparatus comprises a database, an image acquisition unit, and a camera controller. The database is configured to store camera installation information of the cameras including a main camera and one or more sub-cameras. The image acquisition unit is configured to acquire images from the cameras. The camera controller is configured to convert image center coordinates of the image acquired by the main camera to three-dimensional coordinates on a three-dimensional reference coordinate system, by using the camera installation information; select at least one new main camera from among the one or more sub-cameras that include the three-dimensional coordinates as field-of-view information; calculate at least one control value of the newly selected main camera for controlling the newly selected main camera to gaze the three-dimensional coordinates; calculate a transfer path from the main camera to the newly selected main camera by incrementing the control values of the main camera and the newly selected camera; and change one of the sub-cameras into the new main camera based on the transfer path.

In accordance with yet another aspect of the present disclosure, the apparatus for controlling cameras is configured to acquire images from the cameras including a main camera and one or more sub-cameras; convert image center coordinates of the image acquired by the main camera to three-dimensional coordinates on a three-dimensional reference coordinate system, by using prestored camera installation information; select at least one new main camera from among the one or more sub-cameras that include the three-dimensional coordinates as field-of-view information; and calculat a control value of the newly selected main camera for controlling the newly selected main camera to gaze the three-dimensional coordinates.

In accordance with yet another embodiment of the present disclosure, an apparatus for controlling cameras is configured to acquire images from the cameras including a main camera and one or more sub-cameras; convert image center coordinates of the image acquired by the main camera to three-dimensional coordinates on a three-dimensional reference coordinate system, by using prestored camera installation information; select at least one new main camera from among the one or more sub-cameras that include the three-dimensional coordinates as field-of-view information; calculat a control value of the newly selected main camera for controlling the newly selected main camera to gaze the three-dimensional coordinates; and calculat a transfer path from the main camera to the newly selected main camera by incrementing the control values of the main camera and the newly selected camera, and chang one of the sub-cameras into the new main camera based on the transfer path.

DETAILED DESCRIPTION

Hereinafter, with reference to the accompanying drawings, at least one embodiment will be described in detail.

The present disclosure in some embodiments seeks to provide a method and an apparatus for controlling a main camera in synchronization with secondary cameras whereby the secondary cameras follow suit after the main camera to capture a particular location designated in a main camera image.

Figure 1:
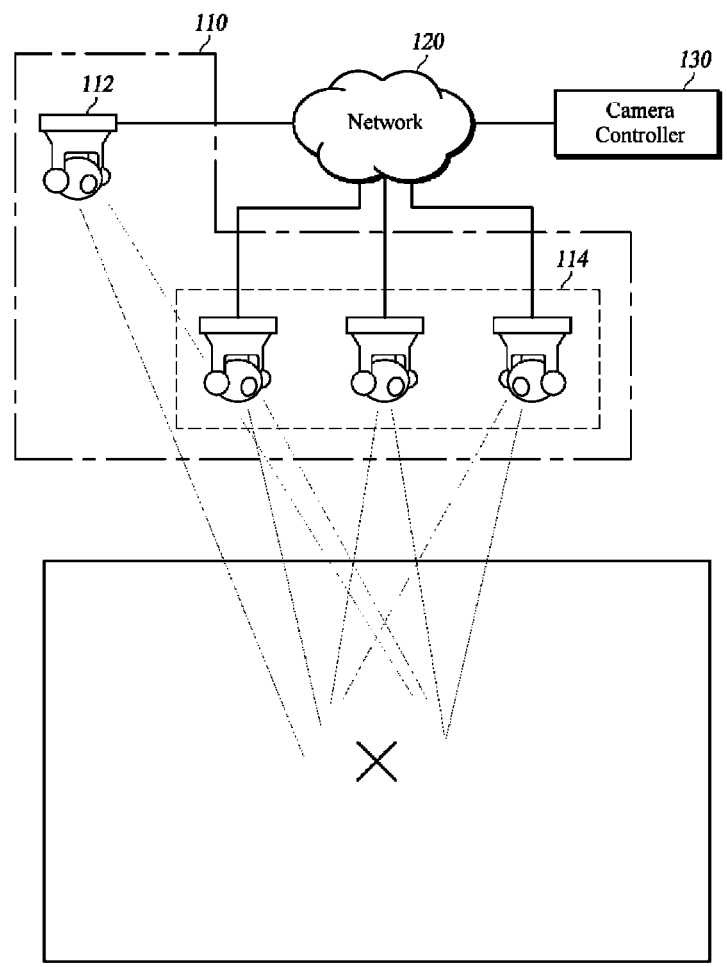
FIG. 1 is a schematic block diagram of a camera control system according to at least one embodiment of the present disclosure.

FIG. 1 is a schematic block diagram of a camera control system according to at least one embodiment of the present disclosure.

A camera control system includes, but not necessarily limited to, one or more cameras 110, a network 120 and a camera controller 130.

The cameras 110 refer to camera modules respectively including optical lens (hereinafter referred to as "lens" for convenience of explanation) and an imaging device which can capture still images or video, and at least one motor (or motor drive) to operate a tilt control and zoom-in/zoom-out of the lens or rotate a body of camera to catch and/or track a moving object. Here, each camera module can be configured as a pan-tilt-zoom (PTZ) camera (a camera that is capable of remote directional and zoom control), but not limited thereto. The PTZ camera magnifies and tracks the moving object with a lens unit capable of a pan control, a tilt control and zoom-in/zoom-out. As a photographing apparatus, the cameras 110 are respectively equipped with an image sensing device (for example, CMOS: complementary metal-oxide semiconductor or CCD: charge-coupled device) and a lens unit. Each of the cameras 110 obtains images at a fixed area (predetermined place). Based on its fixed position, each of the cameras 110 takes images of an area corresponding to a predetermined FOV information. In addition, each of the cameras 110, by controlling the motor, makes the lens move by rotation or panning, tilting, zooming in and out within a certain range to cause the FOV information at the photographing locations, although the fixed camera locations keep the cameras from getting out of the set ranges.

Each of the cameras 110 refers to a device for imaging and recording images of objects, and are each implemented by a camera for CCTV (closed circuit television) that can capture images for use in crime prevention such as monitoring for security or of disorders or a traffic violation. Each of the cameras 110 can be implemented by a surveillance camera or a camera for broadcasting purpose.

The cameras 110 include a main camera 112 and one or more sub-cameras 114. Main camera 112 is selected through user's operation or command from the cameras 110 and it is meant to be directly controlled by camera controller 130. Sub-cameras 114 are the cameras except for main camera 112 among the cameras 110. Main camera 112 and sub-cameras 114 each connect to and inter-work via network 120. Based on a control information, camera controller 130 controls main camera 112 and sub-cameras 114. According to the user's operation or command, the camera controller 130 generates the control information for causing, for example, an image rotation, and a tilt control and zoom-in/zoom-out of the lens. Camera controller 130 controls sub-cameras 114 based on the control information. Other components of the camera control system, such as each of the cameras 110 and the camera controller 130 is implemented by, or includes, one or more processors and/or application-specific integrated circuits (ASICs). Each of the cameras 110 and the camera controller 130 comprises input units such as one or more buttons, a touch screen, a mic and so on, and output units such as a display, an indicator and so on.

As a network utilizing a variety of wired or wireless communication technologies such as an Internet network, intranet network, mobile communication network, satellite communication network and a personal or local area network, network 120 transmits and receives data by an Internet Protocol. Network 120 inter-works with and connects to the cameras 110. And the camera controller 130 sends a video or an image taken by the cameras 110 via network 120. Network 120 operates in conjunction with camera controller 130 to store computing resources including hardware and software. Network 120 includes one or more components or module to perform a cloud computing network capable of providing the computing resources to the relevant terminal. Cloud computing, provided by the network 120, refers to such an environment where information is stored permanently in servers on the Internet and temporarily in client terminals such as desktops, tablet computers, laptops, netbooks, or smartphones. The cloud computing, provided by the network 120, also refers to an access network in a computing environment that enables all the information on the user to be stored in the servers on the Internet and to be read out for use anywhere and anytime through various IT devices.

Network 120 comprises various networks such as CDMA (code division multiple access), WCDMA (wideband code division multiple access), GSM (global system for mobile communications), LTE (long term evolution), EPC (evolved packet core), etc. as well as closed networks including LAN (local area network) and WAN (wide area network) and open networks like the Internet. Network 120 further represents future generations of networks to be implemented and cloud computing networks as well. In addition, when implemented as a personal or local area network, network 120 is supportive of at least one of such wireless personal/local area networks or short-range communication network as Bluetooth, RFID (radio frequency identification), NFC (near field communication), IrDA (infrared data association) and ZigBee.

The camera controller 130 acquires a video or image captured or taken by cameras 110 via network 120. The camera controller 130 generates control information by the user's operation or command and the camera controller 130 controls cameras 110 based on the control information. The camera controller 130 includes a dedicated display unit and a user input unit. The user input unit receives instructions manually input through a user's operation or automatically input through communication. Here, the user's command includes a control command for controlling the cameras 110. The user input unit is implemented using a mouse, keyboard, joystick, touch screen among others. The display unit is adapted to display images received from the cameras 110 or various kinds of information on the state of operation of the camera controller 130.

The camera controller 130 stores installation information of each of the cameras 110 to obtain images from each of the cameras 110. The camera controller 130 obtains the images either from the main camera 112 or from the sub-cameras 114. The camera controller 130 utilizes the camera installation information for converting image center coordinates of the images captured by the main camera 112 to three-dimensional coordinates on the three-dimensional reference coordinate system. The camera controller 130 selects, as a new main camera, one from the sub-cameras 114 that includes the three-dimensional coordinates as FOV information. The camera controller 130 calculates a control value of the newly selected main camera for controlling the newly selected main camera to gaze the three-dimensional coordinates. Here, the camera installation information includes camera setup coordinates information and setup directional information of each camera generated based on the three-dimensional reference coordinate system. Then, on the basis of the calculated control value, the camera controller 130 controls the newly selected main camera by at least one of its pan data, tilt data and zoom-in/zoom-out data so that the newly selected main camera sets the three-dimensional coordinates respectively as image center coordinates.

Figure 5:
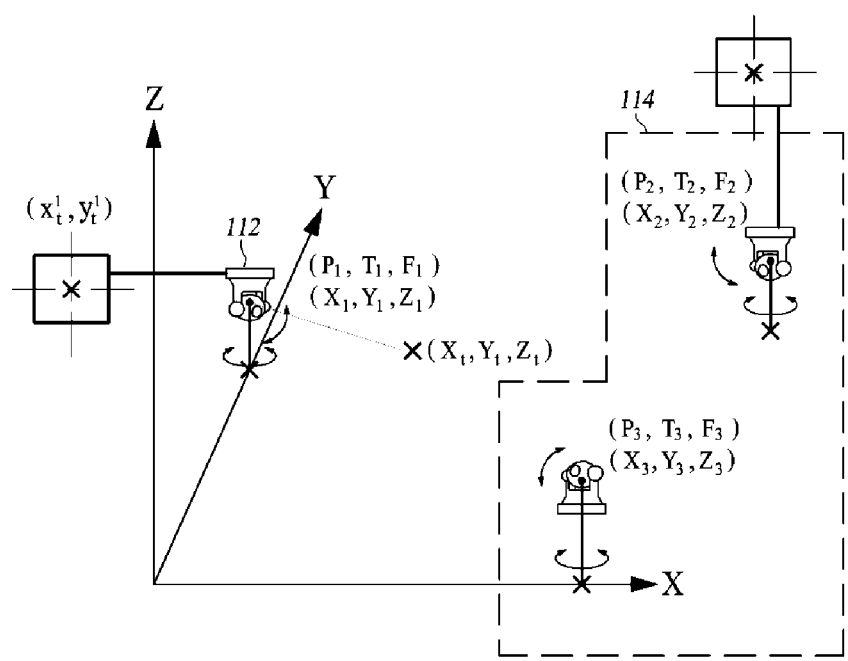
FIG. 5 is a diagram of an exemplary camera control according to at least one embodiment of the present disclosure.

The following will describe a process for conversion into three-dimensional coordinate performed by the camera controller 130. The camera controller 130 extracts image center coordinates $(x^1_t, y^1_t)$ of the main camera 112 by using an image coordinate system of the image that the main camera 112 captures at certain time t. Here, the image coordinate system is a two-dimensional coordinate system of the image from each of the cameras 110 and has coordinates for separately representing opposite ends of the image by x and y axes. At time t and on the three-dimensional reference coordinate system, the camera controller 130 converts the ground-touching location of the principal axis of the main camera 112, corresponding to image center coordinates $(x^1_t, y^1_t)$ of the main camera 112, to a three-dimensional coordinates $(X_t, Y_t, Z_t)$. For example, three-dimensional reference coordinate system represents the coordinate system in a space, which is a place to set up the cameras 110, that serves as a reference. To identify corresponding position of each of the cameras 110, the three-dimensional reference coordinate system is set up in an arbitrary space with the X-axis by a line at the bottom, Y-axis by a left side line as the bottom and Z-axis by a vertical line passing a bottom point of the space, as shown in FIG. 5 (i.e., the vertical line which indicates a vertical distance from a positon at which the specific camera set up to a bottom point of the space). For example, "1" indicates, as an identification number, the main camera 112 among the cameras 110 setup in the space.

In the following, the transfer process performed by the camera controller 130 for transferring the duty of the main camera 112 to one of the sub-cameras 114 will be described. The camera controller 130 calculates a transfer path of main camera 112 by accumulating the control values of the main camera 112 and one or more successor main cameras Based on the transfer path, the camera controller 130 controls to transfer the duty of main camera 112 to one of sub-cameras 114, which becomes a new successor main camera. If the transfer path approaches the boundary of the field of view of the main camera 112, the camera controller 130 changes one of sub-cameras 114, which has field-of-view information corresponding to the transfer path, into a new main camera.

The camera controller 130 is implemented as a separate device for transferring the main camera duty on the basis of the transfer path. The camera controller 130 saves installation information of each of the cameras 110 to get images therefrom. The camera controller 130 utilizes the camera installation information for converting the image center coordinates of the image acquired by the current main camera 112 to three-dimensional coordinates of the three-dimensional reference coordinate system. The camera controller 130 selects a new main camera, which is replaced for the current main camera 112, from among one or more sub-cameras 114 that include the three-dimensional coordinates as field-of-view information, and it calculates a control value of the newly selected main camera for controlling the same camera to gaze the three-dimensional coordinates. The camera controller 130 calculates the transfer path of the main camera 112 by accumulating the control values of main camera 112 and the successor main cameras. Based on the transfer path, the camera controller 130 controls to entitle one of sub-cameras 114 to be a new main camera which is replaced for the current main camera 112.

Figure 2:
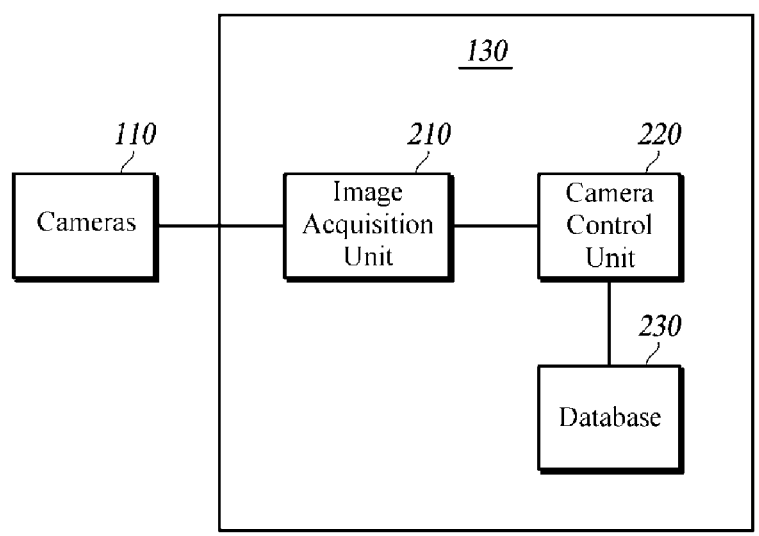
FIG. 2 is a schematic block diagram of a camera controller according to at least one embodiment of the present disclosure.

FIG. 2 is a schematic block diagram of a camera controller according to at least one embodiment of the present disclosure.

A camera controller 130 includes, but not necessarily limited to, an image acquisition unit 210, a camera control unit 220 and a database 230. Other components of the camera controller 130, such as the image acquisition unit 210, the camera control unit 220 are implemented by one or more processors and/or application-specific integrated circuits (ASICs). The database 230 is implemented for a storage media. The camera controller 130 comprises input units such as one or more buttons, a touch screen, a mic and so on, and output units such as a display, an indicator and so on.

The image acquisition unit 210 obtains images from the cameras 110. The image acquisition unit 210 acquires the images from the main camera 112 or the sub-cameras 114, all of which are included in cameras 110.

The camera control unit 220 utilizes the camera installation information prestored in data base 230 for converting image center coordinates of the images captured by the main camera 112 to three-dimensional coordinates on the three-dimensional reference coordinate system. The camera control unit 220 selects, as a new main camera which is replaced for the current main camera 112, one of the sub-cameras 114 that includes the three-dimensional coordinates as FOV information. The camera control unit 220 calculates a control value of the newly selected main camera for controlling the newly selected main camera to gaze the three-dimensional coordinates. Then, on the basis of the calculated control value, the camera control unit 220 controls the newly selected main camera by at least one of its pan data, tilt data and zoom-in/zoom-out data so that the newly selected main camera sets the three-dimensional coordinates respectively as image center coordinates.

A process for conversion into three-dimensional coordinates performed by the camera control unit 220 is as follows. The camera control unit 220 extracts image center coordinates $(x^1_t, y^1_t)$ of the main camera 112 by using the image coordinate system of the image that the main camera 112 captures at certain time t. Here, the image coordinate system is a two-dimensional coordinate system of the image from each camera and has coordinates for separately representing opposite ends of the image by x and y axes. At time t and on the three-dimensional reference coordinate system, the camera control unit 220 converts the ground-touching location of the principal axis of the main camera 112, corresponding to image center coordinates $(x^1_t, y^1_t)$ of main camera 112, to three-dimensional coordinates $(X_t, Y_t, Z_t)$.

The following will describe a process performed by the camera control unit 220 for transferring the main camera duty between the main camera 112 and the sub-cameras 114 along a transfer path of the main camera 112. The camera control unit 220 calculates the transfer path of the main camera 112 by accumulating the control values of the main camera 112 and successor main cameras (i.e., newly selected main cameras replaced for the current main camera). Based on the transfer path, which takes place according to the movement of the moving object, the camera control unit 220 controls to entitle one of the sub-cameras 114 as a new main camera (i.e., newly selected main cameras replaced for the current main camera). When the transfer path approaches the boundary of the field of view of the main camera 112, the camera control unit 220 determines one of the sub-cameras 114, which has field-of-view information corresponding to the transfer path, into the new main camera (i.e., newly selected main cameras replaced for the previous main camera 112).

Database 230 stores installation information of each of the cameras 110. Here, the camera installation information includes camera setup coordinates information and setup directional information of each camera based on the three-dimensional reference coordinate system.

Figure 3:
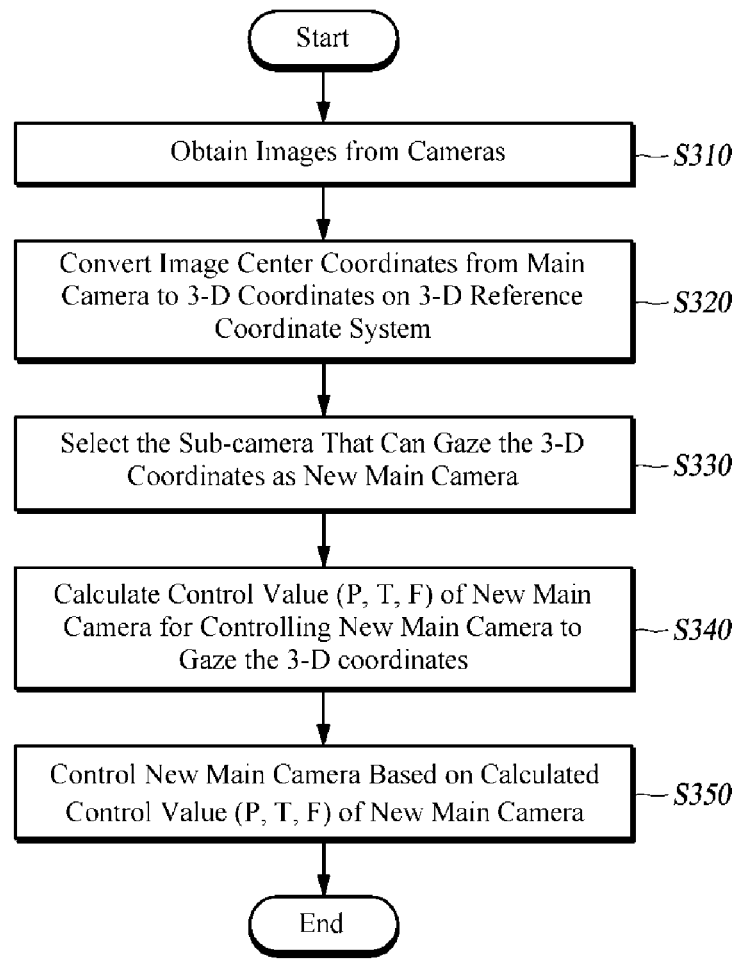
FIG. 3 is a flowchart of a camera control method according to at least one embodiment of the present disclosure.

FIG. 3 is a flowchart of a camera control method according to at least one embodiment of the present disclosure.

Camera controller 130 obtains the images captured by and transferred from the cameras 110 (in step S310). Camera controller 130 utilizes the camera installation information for converting image center coordinates of the images captured by the main camera 112 among the cameras 110 to three-dimensional coordinates on the three-dimensional reference coordinate system (S320). In step S320, the camera controller 130 extracts image center coordinates $(x^1_t, y^1_t)$ of the main camera 112 by using the image coordinate system of the image that main camera 112 captures at certain time t. Here, the image coordinate system is a two-dimensional coordinate system of the image from each of the cameras 110 and has coordinates for separately representing opposite ends of the image by x and y axes. At time t and on the three-dimensional reference coordinate system, the camera controller 130 converts the ground-touching location of the principal axis of the main camera 112, corresponding to image center coordinates $(x^1_t, y^1_t)$ of the main camera 112, to three-dimensional coordinates $(X_t, Y_t, Z_t)$.

Camera controller 130 selects, as the new main camera, from among the cameras 110, one of the sub-cameras 114 that includes the three-dimensional coordinates as FOV information (S330). In step S330, as another exemplary embodiment, camera controller 130 can select two or more cameras from the sub-cameras 114. Camera controller 130 calculates a control value of the newly selected main camera for controlling at least one sub-camera selected as the successor main camera to gaze the three-dimensional coordinates (S340). Here, the camera installation information includes camera setup coordinates information and setup directional information of each camera, generated based on the three-dimensional reference coordinate system. Based on the calculated control value, the camera controller 130 controls the newly selected main camera by at least one of its pan data, tilt data and zoom-in/zoom-out data so that the new main camera sets the three-dimensional coordinates respectively as image center coordinates (S350).

Although FIG. 3 has been depicted by sequentially carrying out the step S310 to step S350, they are merely provided only to present the technical concept of the embodiments in an illustrative manner where it would be appreciated by those skilled in this field that without departing from characteristics of the described embodiments, there may be various applicable changes and modifications by either changing the sequence depicted in FIG. 3 or carrying out in parallel, one or more of steps S310 to S350, and therefore FIG. 3 is not intended to be limited to the time-series order.

As described above, the camera control method according to the at least one embodiment as described above and shown in FIG. 3 is implemented as a computer program, and is recorded in a non-transitory computer readable media. The non-transitory computer readable media storing the program for realizing the camera control method according to at least one embodiment of the present disclosure is any data storage device that can store data which can be thereafter read by a computer system. Examples of the computer-readable recording medium include ROMs, RAMs, CD-ROMs, magnetic tapes, floppy disks, and optical data storage devices. The a non-transitory computer readable media is also distributed over network coupled computer systems so that computer-readable codes are stored and executed in a distributed fashion. In addition, functional programs, codes, and code segments for accomplishing at least one embodiment of the present disclosure is easily designed by programmers skilled in the art to which the present disclosure pertains.

Figure 4:
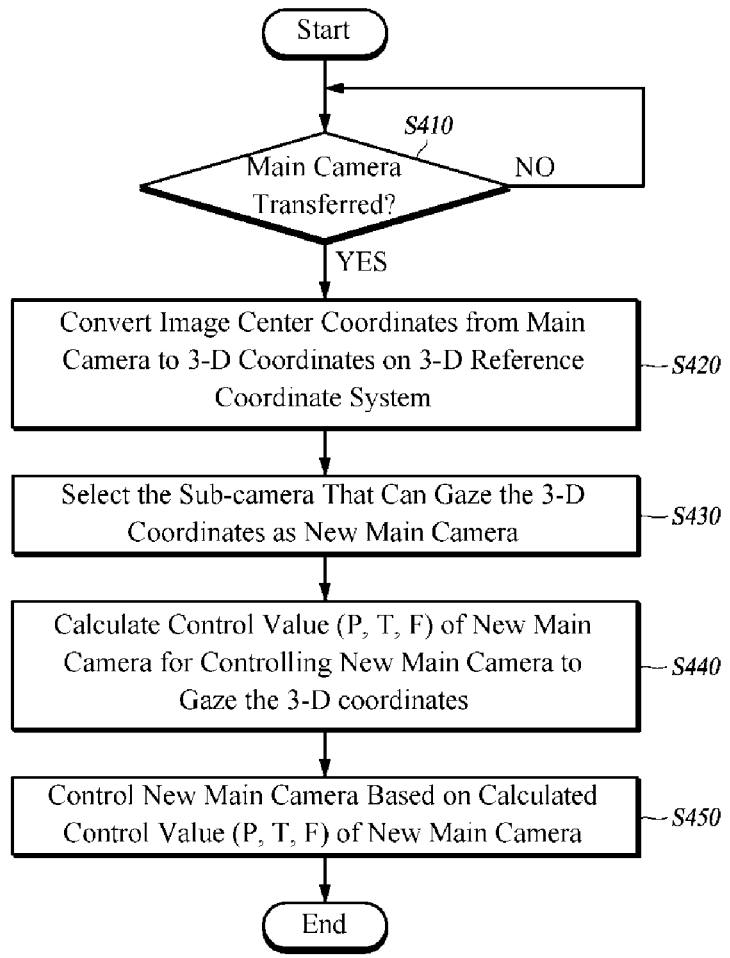
FIG. 4 is a flowchart of a method for transferring the main camera duty based on a camera transfer path according to at least one embodiment of the present disclosure.

FIG. 4 is a flowchart of a method for transferring the main camera duty based on a camera transfer path according to at least one embodiment of the present disclosure.

Camera controller 130 checks whether there is a duty transfer of main camera 112 among cameras 112 (S410). In step S410, the camera controller 130 obtains the images captured by and transferred from the cameras 110 and it can see from an input command whether a user desires to transfer the main camera 112.

When in step S410 the camera controller 130 determines that the main camera 112 is transferred among the cameras 112, the camera controller 130 utilizes the camera installation information for converting image center coordinates of the images captured by the main camera 112 among the cameras 110 to three-dimensional coordinates on the three-dimensional reference coordinate system (S420). In step S420, the camera controller 130 extracts image center coordinates $(x^1_t, y^1_t)$ of the main camera 112 by using the image coordinate system of the image that the main camera 112 captures at certain time t. The image coordinate system is a two-dimensional coordinate system of the image captured by and transferred from each of the cameras 110 and has coordinates for separately representing opposite ends of the image by x and y axes. At time t and on the three-dimensional reference coordinate system, camera controller 130 converts the ground-touching location of the principal axis of main camera 112, corresponding to image center coordinates $(x^1_t, y^1_t)$ of main camera 112, to three-dimensional coordinates $(X_t, Y_t, Z_t)$.

Camera controller 130 selects, as the new main camera from cameras 110, the sub-camera 114 that includes the three-dimensional coordinates as FOV information (S430). Camera controller 130 calculates a control value of the newly selected main camera for controlling at least one sub-camera selected as the successor camera to gaze the three-dimensional coordinates of the new main camera (S440). Here, the camera installation information includes camera setup coordinates information and setup directional information of each of the cameras 110, generated based on the three-dimensional reference coordinate system. Based on the calculated control value, the camera controller 130 controls the newly selected main camera by using at least one of its pan data, tilt data and zoom-in/zoom-out data so that the new main camera sets the three-dimensional coordinates respectively as image center coordinates (S450).

Although FIG. 4 has been depicted by sequentially carrying out the step S410 to step S450, they are merely provided only to present the technical concept of the embodiments in an illustrative manner where it would be appreciated by those skilled in this field that without departing from characteristics of the described embodiments, there may be various applicable changes and modifications by either changing the sequence depicted in FIG. 4 or carrying out in parallel, one or more of steps S410 to S450, and therefore FIG. 4 is not intended to be limited to the time-series order.

FIG. 5 is a diagram of an exemplary camera control according to at least one embodiment of the present disclosure.

Three-dimensional reference coordinate system represents the coordinate system in a space that serves as a reference. As shown by the example of FIG. 5, the three-dimensional reference coordinate system is set up in an arbitrary space with the X-axis by a line at the bottom, Y-axis by a left side line and Z-axis by a vertical line passing a bottom point. The three-dimensional reference coordinate system needs not be stored in database 230, although not limited thereto. Database 230 stores camera setup coordinates information (FIG. 5 shows $X_1, Y_1, Z_1$ through $X_3, Y_3, Z_3$) of each of the cameras 110 and camera setup directional information of each of the cameras (FIG. 5 shows $P_1, T_1, F_1$ through $P_3, T_3, F_3$). Here, "P" indicates information related to a pan of a camera among the setup directional information. Here, "T" indicates information related to a tilt of a camera among the setup directional information. Here, "F" indicates information related to a zoom of a camera among the setup directional information. Here, "1" (e.g., designated as an identification number of the main camera 112) and "3" (e.g., designated as an identification number of one of the sub-cameras 114) indicate cameras setup in the space to identify corresponding each camera among the cameras 110.

Database 230 stores the camera installation information of each of cameras 110. The camera installation information includes the camera setup coordinates information and the setup directional information of each camera generated based on the three-dimensional reference coordinate system. The camera installation information of the main camera 112 includes setup coordinates information $(X_1, Y_1, Z_1)$ and its setup directional information $(P_1, T_1, F_1)$ as shown in FIG. 5. In addition, the camera installation information of each of the sub-cameras 114 includes setup coordinates information $(X_2, Y_2, Z_2), (X_3, Y_3, Z_3)$ and their setup directional information $(P_2, T_2, F_2), (P_3, T_3, F_3)$ as exemplary shown in FIG. 5.

Camera controller 130 obtains images captured by and transferred from the main camera 112. Camera controller 130 utilizes the camera installation information for converting image center coordinates $(x^1_t, y^1_t)$ of the images captured by the main camera 112 to three-dimensional coordinates $(X_t, Y_t, Z_t)$ on the three-dimensional reference coordinate system. Camera controller 130 extracts image center coordinates $(x^1_t, y^1_t)$ of the main camera 112 by using the image coordinate system of the image that main camera 112 captures at certain time t. Here, the image coordinate system is a two-dimensional coordinate system of the image from each of the cameras 110 and has coordinates for representing opposite ends of the image by x and y axes, respectively. For example, a certain camera image has its top edge set on x-axis (coordinate value increases to the right) and its left side edge set on y-axis (coordinate value increases downward).

Thereafter, at certain time t and on the three-dimensional reference coordinate system, the camera control unit 220 converts the ground-touching location of the principal axis of the main camera 112, corresponding to image center coordinates $(x^1_t, y^1_t)$ of main camera 112, to three-dimensional coordinates $(X_t, Y_t, Z_t)$.

Camera controller 130 selects, as the new main camera, the sub-camera 114 that includes three-dimensional coordinates $(X_t, Y_t, Z_t)$ as FOV information. Camera controller 130 calculates a control value of the new main camera for controlling it to gaze the three-dimensional coordinates $(X_t, Y_t, Z_t)$. Then, on the basis of the calculated control value, the camera controller 130 controls the newly selected main camera by using at least one of its pan data, tilt data and zoom-in/zoom-out data so that the newly selected main camera sets three-dimensional coordinates $(X_t, Y_t, Z_t)$ respectively as image center coordinates $(x^2_t, y^2_t), (x^3_t, y^3_t)$. Here, "2" and "3" are respectively designated as an identification number of one of the sub-cameras 114. Each camera designated as "2" or "3" indicates the newly selected main camera from among the sub-cameras 114.

Coordinates '$X_t, Y_t, Z_t$' illustrated in FIG. 5 are generated when the camera controller 130 converts the image center coordinates of the image captured by using the main camera 112 to the three-dimensional coordinates on the three-dimensional reference coordinate system. Coordinates '$X_t, Y_t, Z_t$' are meant to present at time t and on the three-dimensional reference coordinate system, the location of intersection between the ground (including rocks, mountains and artifacts such as buildings) and the principal axis (a straight line passing through the center of the camera lens perpendicularly thereto) of main camera 112, corresponding to image center coordinates $(x^1_t, y^1_t)$ of the main camera 112.

As described above, the present disclosure is highly useful for application in the fields of camera control, for controlling a main camera to capture a specified location and secondary cameras to follow suit to gaze the same location as the main and secondary cameras are controlled in accord. According to some embodiments of the present disclosure, in response to a main camera designating a specific place, the remaining cameras can cover the same specific place and be controlled as the main camera. According to some embodiments of the present disclosure, a specific position is designated by using a user selected camera among other cameras with fixed locations, whereby commonly controlling the other cameras automatically. Further, according to at least one embodiment, if the object being monitored moves out of the field of view or into a blind spot of the responsible camera, the duty to capture the moving object is transferred to another camera based on a transfer path along the transfers between selected cameras and thereby saves the time for the user to select a particular camera from the multitude of them.

Although exemplary embodiments of the present disclosure have been described for illustrative purposes, those skilled in the art will appreciate that various modifications, additions and substitutions are possible, without departing the spirit and scope of the claimed invention. Specific terms used in this disclosure and drawings are used for illustrative purposes and not to be considered as limitations of the present disclosure. Therefore, exemplary embodiments of the present disclosure have been described for the sake of brevity and clarity. Accordingly, one of ordinary skill would understand the scope of the claimed invention is not limited by the explicitly described above embodiments but by the claims and equivalents thereof.

What is claimed is:

1. An apparatus for controlling cameras, the apparatus comprising:
    a database configured to store camera installation information of the cameras including a main camera and one or more sub-cameras;
    an image acquisition unit configured to acquire images from the cameras; and a camera controller configured to
  convert image center coordinates of the image acquired by the main camera to three-dimensional coordinates on a three-dimensional reference coordinate system, by using the camera installation information, wherein the camera installation information includes (i) camera setup coordinates information and (ii) setup directional information of each camera of the main camera and the sub-cameras, and the camera installation information is generated based on the three-dimensional reference coordinate system,
  select, from among the one or more sub-cameras, at least one sub-camera including the converted three-dimensional coordinates as field-of-view information, and set up the selected at least one sub-camera as at least one newly selected main camera,
  calculate a control value of the newly selected main camera for controlling the newly selected main camera to gaze the three-dimensional coordinates; and
  control the newly selected main camera based on the calculated control value by using the setup directional information so that the newly selected main camera sets the converted three-dimensional coordinates respectively as corresponding image center coordinates.

2. The apparatus of claim 1, wherein based on the control value, the camera controller is configured to control the newly selected main camera by using at least one of pan data, tilt data and zoom-in/zoom-out data so that the newly selected main camera sets the three-dimensional coordinates respectively as image center coordinates.

3. The apparatus of claim 1, wherein the camera controller is configured to generate, at certain time t and on the three-dimensional reference coordinate system, three-dimensional coordinates $(X_t, Y_t, Z_t)$ as converted from a location of intersection between the ground and a principal axis of the main camera, corresponding to image center coordinates $(x^1_t, y^1_t)$ of the main camera.

4. The apparatus of claim 1, wherein the camera controller is configured to extract image center coordinates $(x^1_t, y^1_t)$ of the main camera by using an image coordinate system of the image that the main camera captures at certain time t.

5. The apparatus of claim 4, wherein the image coordinate system is a two-dimensional coordinate system of the image from each of the cameras and has coordinates for representing opposite ends of the image by x and y axes, respectively.

6. The apparatus of claim 4, wherein the image acquisition unit is configured to interconnect with the cameras through a network.

7. The apparatus of claim 1, wherein the setup coordinates information and the setup directional information are generated on the three-dimensional reference coordinate system, and
  the setup directional information includes at least one of pan data, tilt data and zoom-in/zoom-out data of said each camera of the main camera and the sub-cameras.

8. The apparatus of claim 1, wherein the camera controller is configured to calculate a transfer path of the main camera by accumulating at least one control value of the main camera and the newly selected main camera as the camera controller transfers the duty of the main camera to the sub-camera to be recognized as the newly selected main camera.

9. The apparatus of claim 8, wherein when the transfer path approaches a boundary of a field of view of the main camera, the camera controller is configured to change one of the sub-cameras, which has field-of-view information corresponding to the transfer path, into the newly selected main camera.

10. An apparatus for controlling cameras, the apparatus comprising:
  a database configured to store camera installation information of the cameras including a main camera and one or more sub-cameras;
  an image acquisition unit configured to acquire images from the cameras; and
  a camera controller configured to
    convert image center coordinates of the image acquired by the main camera to three-dimensional coordinates on a three-dimensional reference coordinate system, by using the camera installation information, wherein the camera installation information includes (i) camera setup coordinates information and (ii) setup directional information of each camera of the main camera and the sub-cameras, and the camera installation information is generated based on the three-dimensional reference coordinate system,
    select, from among the one or more sub-camera, at least one sub-camera including the converted three-dimensional coordinates as field-of-view information, and set up the selected at least one sub-camera as at least one newly selected main camera,
    calculate at least one control value of the newly selected main camera for controlling the newly selected main camera to gaze the three-dimensional coordinates,
    control the newly selected main camera based on the calculated control value by using the setup directional information so that the newly selected main camera sets the converted three-dimensional coordinates respectively as corresponding image center coordinates,
    calculate a transfer path from the main camera to the newly selected main camera by incrementing the control values of the main camera and the newly selected camera, and
    change one of the sub-cameras into the new main camera based on the transfer path.

11. A method performed by an apparatus for controlling cameras, the method comprising:
  acquiring images from the cameras including a main camera and one or more sub-cameras;
  converting image center coordinates of the image acquired by the main camera to three-dimensional coordinates on a three-dimensional reference coordinate system, by using prestored camera installation information, wherein the camera installation information includes (i) camera setup coordinates information and (ii) setup directional information of each camera of the main camera and the sub-cameras, and the camera installation information is generated based on the three-dimensional reference coordinate system;
  selecting, from among the one or more sub-cameras, at least one sub-camera including the converted three-dimensional coordinates as field-of-view information, and set up the selected at least one sub-camera as at least one newly selected main camera;
  calculating a control value of the newly selected main camera for controlling the newly selected main camera to gaze the three-dimensional coordinates; and
  controlling the newly selected main camera based on the calculated control value by using the setup directional information so that the newly selected main camera sets the converted three-dimensional coordinates respectively as corresponding image center coordinates.

12. The method of claim 11, further comprising
generating, at certain time t and on the three-dimensional reference coordinate system, three-dimensional coordinates $(X_t, Y_t, Z_t)$ as converted from a location of intersection between the ground and a principal axis of the main camera, corresponding to image center coordinates $(x^1_t, y^1_t)$ of the main camera.

13. The method of claim 11, further comprising
extracting image center coordinates $(x^1_t, y^1_t)$ of the main camera by using an image coordinate system of the image that the main camera captures at certain time t.

14. The method of claim 11, further comprising
calculating a transfer path of the main camera by accumulating at least one control value of the main camera and the newly selected main camera as the camera controller transfers the duty of the main camera to the sub-camera to be recognized as the newly selected main camera.

15. The method of claim 11, wherein the setup coordinates information and the setup directional information are generated on the three-dimensional reference coordinate system, and
the setup directional information includes at least one of pan data, tilt data and zoom-in/zoom-out data of said each camera of the main camera and the sub-cameras.

16. A method performed by an apparatus for controlling cameras, the method comprising:
acquiring images from the cameras including a main camera and one or more sub-cameras;
converting image center coordinates of the image acquired by the main camera to three-dimensional coordinates on a three-dimensional reference coordinate system, by using prestored camera installation information, wherein the camera installation information includes (i) camera setup coordinates information and (ii) setup directional information of each camera of the main camera and the sub-cameras, and the camera installation information is generated based on the three-dimensional reference coordinate system;
selecting, from among the one or more sub-cameras, at least one sub-camera including the converted three-dimensional coordinates as field-of-view information, and set up the selected at least one sub-camera as at least one newly selected main camera;
calculating a control value of the newly selected main camera for controlling the newly selected main camera to gaze the three-dimensional coordinates;
controlling the newly selected main camera based on the calculated control value by using the setup directional information so that the newly selected main camera sets the converted three-dimensional coordinates respectively as corresponding image center coordinates;
calculating a transfer path from the main camera to the newly selected main camera by incrementing the control values of the main camera and the newly selected camera; and
changing one of the sub-cameras into the new main camera based on the transfer path.

* * * * *